US011963638B2

(12) United States Patent
Eissengarthen et al.

(10) Patent No.: US 11,963,638 B2
(45) Date of Patent: Apr. 23, 2024

(54) DOMESTIC APPLIANCE FOR PROCESSING FOODS AND SPLASH GUARD THEREFOR

(71) Applicant: DE'LONGHI BRAUN HOUSEHOLD GMBH, Neu-Isenburg (DE)

(72) Inventors: Christoph Eissengarthen, Nackenheim (DE); Christof Kleemann, Bad Homburg (DE); Christian Dexheimer, Langen (DE); Daniel Lebsack, Laudenbach (DE); Thea Kleinmagd, Frankfurt am Main (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 764 days.

(21) Appl. No.: 17/054,901

(22) PCT Filed: Apr. 12, 2019

(86) PCT No.: PCT/EP2019/059457
§ 371 (c)(1),
(2) Date: Nov. 12, 2020

(87) PCT Pub. No.: WO2019/219310
PCT Pub. Date: Nov. 21, 2019

(65) Prior Publication Data
US 2021/0251429 A1    Aug. 19, 2021

(30) Foreign Application Priority Data
May 15, 2018  (DE) .................. 10 2018 207 506.9

(51) Int. Cl.
*A47J 43/07*  (2006.01)
*A47J 43/044*  (2006.01)

(52) U.S. Cl.
CPC ......... *A47J 43/0705* (2013.01); *A47J 43/044* (2013.01); *A47J 2043/04427* (2013.01);
(Continued)

(58) Field of Classification Search
CPC .... A47J 2043/04427; A47J 2043/04436; A47J 2043/04454; A47J 43/044; A47J 43/0705
(Continued)

(56) References Cited

U.S. PATENT DOCUMENTS 5,310,981 A   5/1994   Sarnoff et al.
5,360,170 A   11/1994  Cartellone
(Continued)

FOREIGN PATENT DOCUMENTS

CA      2325807 A1   5/2002
CN    101138466 A    3/2008
(Continued)

OTHER PUBLICATIONS

English Translation of International Search Report of the International Searching Authority, dated Jun. 11, 2019, with respect to International Application No. PCT/EP2019/059457.
(Continued)

*Primary Examiner* — Dana Ross
*Assistant Examiner* — James F Sims, III
(74) *Attorney, Agent, or Firm* — Scott R. Cox

(57) ABSTRACT

A domestic appliance for processing foods including:
a bowl, with an opening for introducing foods into the bowl and into which a tool for processing foods is inserted,
a splash guard, which can be inserted into the opening of the bowl, such that boundary regions of the splash guard are opposite an inner wall of the opening to prevent foods from spraying out of the bowl, and
a cover, which can be inserted into the opening of the bowl once the splash guard has been inserted into the opening of the bowl,
wherein the splash guard includes a plate which extends substantially flat and ends with boundary regions.

16 Claims, 6 Drawing Sheets

(52) U.S. Cl.
CPC ............... *A47J 2043/04436* (2013.01); *A47J 2043/04454* (2013.01)

(58) Field of Classification Search
USPC ........................................................ 99/495
See application file for complete search history.

(56) References Cited

U.S. PATENT DOCUMENTS

| | | | |
|---|---|---|---|
| 6,035,771 | A | 3/2000 | Conran et al. |
| 9,572,457 | B2 | 2/2017 | Ryan |
| 10,258,200 | B2 | 4/2019 | Wolf et al. |
| 10,278,542 | B2 | 5/2019 | Wolf et al. |
| 2004/0213085 | A1 | 10/2004 | Estes |
| 2012/0014207 | A1 | 1/2012 | Lee et al. |
| 2014/0203127 | A1 | 7/2014 | Merl |
| 2016/0287011 | A1 | 10/2016 | Deshayes et al. |
| 2020/0359840 | A1 | 11/2020 | Li et al. |
| 2022/0022694 | A1 | 1/2022 | Silvestrini et al. |

FOREIGN PATENT DOCUMENTS

| | | | | |
|---|---|---|---|---|
| CN | 204232955 | U | 4/2015 | |
| CN | 206443615 | U | 8/2017 | |
| DE | 102011004483 | A1 | 8/2012 | |
| DE | 202013100303 | U1 | 2/2013 | |
| EP | 3311717 | A1 | 4/2018 | |
| GB | 2194165 | A * | 3/1988 | ............ A47J 43/044 |
| GB | 2327864 | A | 2/1999 | |
| JP | 62-148233 | A | 7/1987 | |
| JP | 1999244159 | A1 | 9/1999 | |
| JP | 2005058645 | A | 3/2005 | |
| KR | 200456879 | Y1 | 11/2011 | |
| RU | 144806 | U1 | 8/2014 | |
| RU | 2650056 | C1 | 4/2018 | |
| WO | 1998024350 | A1 | 6/1998 | |
| WO | 2013/097702 | A1 | 7/2013 | |
| WO | 2013/181692 | A1 | 12/2013 | |

OTHER PUBLICATIONS

English Translation of International Preliminary Report on Patentability of the International Searching Authority, dated Sep. 24, 2020, with respect to International Application No. PCT/EP2019/059457.
Written Opinion of the International Searching Authority, dated Nov. 21, 2019, with respect to International Application No. PCT/EP2019/059457, cited only for references disclosed therein.
Written Opinion of the International Searching Authority, dated Apr. 23, 2020, with respect to International Application No. PCT/EP2019/059457, cited only for references disclosed therein.
Official Communication Russian Patent Office dated Jul. 2, 2021, in corresponding parallel RU application—PCT/ EP2019/0059457—cited only for references disclosed therein. Other non-cited references previously disclosed.
English translation of Official Action from Chinese Patent Office dated Oct. 24, 2022, in corresponding parallel Chinese Application No. 201980032592.6—cited only for references disclosed therein. Other non-cited references previously disclosed.
English translation of Official Action from Japanese Patent Office dated Feb. 1, 2022, in corresponding parallel Japanese Application No. 2020-564120—cited only for references disclosed therein. Other non-cited references previously disclosed.
U.S. Appl. No. 17/310,451, unpublished.

* cited by examiner

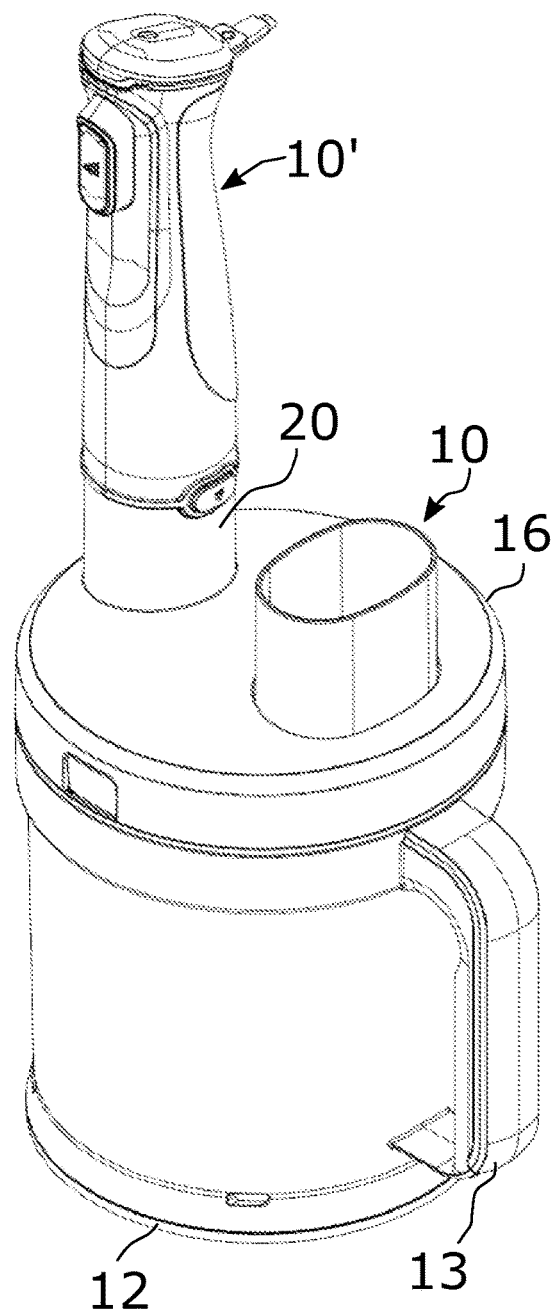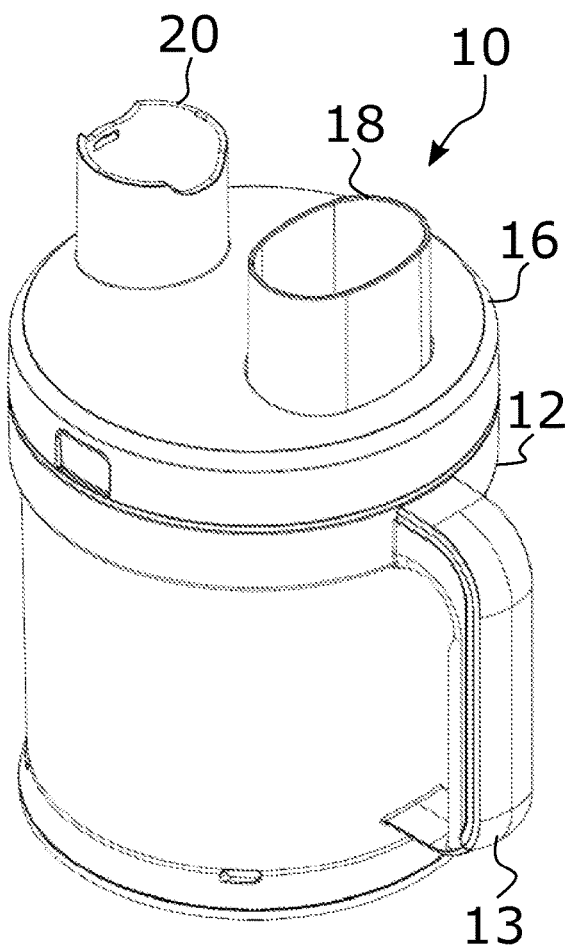
FIG.1a)
FIG.1b)

DOMESTIC APPLIANCE FOR PROCESSING FOODS AND SPLASH GUARD THEREFOR

TECHNICAL FIELD

The present invention relates to a domestic appliance for processing foods and to a splash guard for such an appliance.

TECHNICAL BACKGROUND

Handheld domestic appliances are widely used in both private and professional kitchens. Handheld stick blenders and handheld food processors are particularly popular. These appliances are typically sold with various detachable tools and accessories for different application purposes, as a consequence of which these appliances offer great flexibility.

Such accessories include, inter alia, attachments for processing or comminuting foods, which are often also referred to as choppers or food processors. These consist of a bowl, various processing tools which can be arranged in the bowl, and a cover with a gear mechanism which reduces the speed. The cover is designed to couple the processing tool on the underside of the cover to the gear mechanism and to couple a motor unit on the upper side of the cover to the gear mechanism. The motor unit contains an electric motor inside. The gear mechanism reduces the rotational speed of the motor to a level that is suitable for the tool. The cover often comprises a delivery tube to facilitate the addition of further foods while the appliance is being operated.

With the majority of the accessories available on the market, the cover comprises a non-detachable built-in gear mechanism. An example of such an arrangement is disclosed in CN 101 138 466 A. In this embodiment, the covers cannot be cleaned in a dishwasher since otherwise water would penetrate the cover and the gear mechanism located therein, thereby damaging it or even destroying it in the long term.

This is a problem since during use both the underside of the cover and the inside of the delivery tube are in contact with the foods to be processed and therefore have to be cleaned after each use. However, the gear mechanism is typically provided between an upper part and a lower part of the cover and cannot be detached, wherein a force input shaft, to which an external motor unit is coupled, extends through the upper part, and the output coupling, to which the processing tool is coupled, extends through the lower part. If a cover with this design is placed in the dishwasher, the pressure differences due to heating and cooling in the dishwasher will lead to water penetrating the interior of the cover and therefore also the gear mechanism, which will destroy it over time.

However, it is not possible at a reasonable cost to seal the gear mechanism and cover such that they are able to withstand the operating conditions inside a dishwasher. For this reason, the manufacturers of appliances such as the device from CN 101 138 466 A, for example, generally explicitly state that cleaning the cover in a dishwasher is not permitted. With some devices it is also inadmissible to wash the cover under running water; rather, it is only possible to clean it using a damp cloth. Otherwise, water would gradually collect in the cover, which would destroy the gear mechanism. The cover therefore has to be cleaned by hand. However, this is not very user-friendly since the cover comes into direct contact with the processed foods and therefore often gets heavily soiled. Moreover, the region inside the delivery tube is difficult to reach.

Given these problems, the solutions described in WO 2013/181692 A1 and WO 2013/097702 A1 are advantageous. In these embodiments, the cover consists of just one single part, which comprises a delivery tube for adding foods. The gear mechanism is arranged on top of the cover and can easily be removed by the user. Thus, it can be removed after use and the cover can be placed—without the gear mechanism—in a dishwasher. This results in a considerable improvement to the situation, since the parts that come into contact with foods to a considerable extent during use (namely the underside of the cover and the delivery tube) can be cleaned in a dishwasher, without damage being caused to the gear mechanism. WO 2013/181692 also shows an intermediate coupling which prevents the output of the gear mechanism from coming into direct contact with the tool. An even better separation between foods and the gear mechanism is thereby achieved.

Although this embodiment at least mitigates the disadvantages set out above, it also results, as has been noted by the present inventors, in new disadvantages: In order to arrange the gear mechanism in the cover, the cover has a deep recess in the upper side thereof. This results in deep cavities with sharp corners and narrow niches in the underside thereof, as can be seen in FIG. 9 of U.S. Pat. No. 9,572,457. However, as the inventors have ascertained, these corners and niches cannot be optimally cleaned in a dishwasher since sprayed water cannot easily reach into them. Moreover, the tendency is that food remnants accumulate therein, as the inventors have found, which, depending on the type of food (e.g. yeast dough), can also get stuck and are therefore even more difficult to remove. Thus, corresponding components have to be cleaned more thoroughly than more simply constructed components, but in a dishwasher they can only be cleaned with limited results.

Furthermore, not every user owns or uses a dishwasher. Due to the fissured geometry of the embodiment shown, it is even more difficult to clean by hand than the aforementioned embodiment with a built-in gear mechanism.

Further prior art is disclosed in US 2004/0213085 A1. Prior art products that were on the market include the Breville BSB530XL, which was marketed under the designation "All In One". The Braun MQ70 food processor is another example of the prior art. EP 3 311 717 A1 discloses features which fall under the preamble of claim 1.

DESCRIPTION OF THE INVENTION

The aforementioned disadvantages of the prior art caught the attention of the inventors and an object of the present invention is to mitigate these disadvantages or even eliminate them altogether. In particular, the objective of the invention is to provide a domestic appliance for processing foods, wherein the components of the appliance that come into contact with foods can be cleaned in a dishwasher, but can also easily be cleaned by hand.

The invention is defined by claim 1. Preferred embodiments are defined in the dependent claims. The invention is also defined by claim 16.

According to claim 1, the invention is a domestic appliance for processing foods. Such a domestic appliance may be, for example, a food processor or an accessory device for a hand blender or stick blender.

This domestic appliance comprises a bowl in which the foods to be processed can be introduced through an opening. The foods are processed in this bowl.

A tool for processing foods can be inserted into this bowl. Such a tool may be, for example, blades attached to a shaft which, when rotated, comminute the foods in the bowl. Other tools can also be used, however, such as tools intended for mixing or kneading already comminuted foods.

The domestic appliance further comprises a splash guard. This splash guard is a cover which can be inserted into the opening of the bowl to prevent foods being processed in the bowl from spraying out, or to at least make it difficult for them to do so. The splash guard does not have to be formed as a continuous plate. The splash guard may well have openings which, for example, are intended to allow foods to be introduced into the bowl while the domestic appliance is being operated. Moreover, the splash guard can also comprise an intermediate coupling element which extends through the splash guard in order to facilitate a power transmission from outside the splash guard to the tool located in the bowl. The splash guard is designed such that boundary regions of the splash guard are opposite the inner wall of the opening, in order to prevent foods from spraying out of the bowl. In other words, the splash guard is dimensioned such that there is only a small gap from the inner wall of the opening of the bowl, which does not allow, or only allows to a minimal extent, the penetration of the foods to be processed. This prevents a component of the domestic appliance that is arranged above the splash guard from coming into contact with the processed foods. Additionally or alternatively, a sealing element can be attached on the outer diameter of the splash guard, which additionally improves the seal.

Furthermore, the domestic appliance according to the invention comprises a cover which can be inserted into the opening of the bowl once the splash guard has been inserted into the opening of the bowl (wherein it would also be possible to insert it into the opening without first installing the splash guard, which might, however, result in a non-functional domestic appliance). During use, the cover is arranged such that the splash guard lies between the space of the bowl in which the foods to be processed are located and the cover. The splash guard therefore prevents (or at least hampers) foods being processed by the domestic appliance hitting the cover and soiling it. In this way, the cover, which may also comprise a gear mechanism, for example, is kept clean, while the foods being processed, which would otherwise hit the cover, now hit the splash guard and only soil that. It is therefore not necessary to thoroughly clean the cover after using the domestic appliance; rather, it is sufficient to clean only the splash guard.

According to the invention, the splash guard comprises a plate which extends substantially flat and ends with the boundary regions. The boundary regions are the regions opposite the inner wall of the opening. The feature that the plate of the splash guard extends substantially flat is to be understood such that the splash guard has no recesses for accommodating components such as a cover or gear mechanism, for example. On the contrary, the splash guard is flat on the upper side thereof (i.e. the side opposite the cover during use) and has no significant depressions. In particular, there are also no bulges or similar thickened areas on the peripheral sections, which include the boundary regions, as is the case in the prior art. In other words, the plate of the splash guard is designed such that the upper side of the splash guard, when viewed radially outwards from the center thereof, does not extend substantially perpendicular to the radial direction. In particular, the feature that the plate ends with the boundary regions also signifies that there are no axially extending regions between the flat region of the splash guard and the sections located opposite the inner side of the opening.

Since the splash guard comprises a plate which extends substantially flat and ends with the boundary regions, this splash guard can be easily cleaned, even in a dishwasher. There are no niches or very few shallow niches with smooth transitions in which foods could accumulate, which is covered by the feature that the plate of the splash guard is substantially flat and this flat region ends with the boundary regions. In contrast, in the corresponding component 17 which is shown in FIG. 6 of WO 2013/097702 A1, for example, such niches in which foods could accumulate are present, and these are difficult to clean. Thus, according to the invention the cover rests on the splash guard without penetrating into the splash guard.

Since, as mentioned above, the domestic appliance according to the invention has no niches in which foods could accumulate and which would also be difficult to clean, a corresponding domestic appliance is more user-friendly. The splash guard can be cleaned in a dishwasher since it does not contain any delicate components (such as a gear mechanism, for example) and since all of the parts can be easily reached and cleaned by the water used in a dishwasher. However, the cover, which often cannot be cleaned in a dishwasher since it contains a gear mechanism, for example, is protected from soiling by the splash guard and therefore does not require thorough cleaning. Thus, a corresponding domestic appliance is user-friendly and hygienic.

Preferably, the splash guard comprises a delivery tube for foods, through which tube foods can be introduced into the bowl. A corresponding delivery tube ensures that the user can introduce foods into the bowl and process them there even when using the appliance, without risking coming into contact with the tools. Preferably, the cover has an opening through which the delivery tube extends when the cover is arranged on the appliance.

Moreover, it is preferable for the cover to comprise a motor coupling to which an external motor unit can be coupled. A corresponding motor coupling serves to allow the domestic appliance to be operated by a motor unit provided separately from the domestic appliance. Furthermore, the cover comprises a transmission coupling, which is coupled to the motor coupling and which is configured to output a torque generated by the external motor and exerted on the motor coupling. Preferably, this coupling between the motor coupling and the transmission coupling takes place via a gear mechanism. Such a design allows the cover to facilitate a power transmission from the outside to a tool located in the bowl. Since it is externally driven, a corresponding domestic appliance is user-friendly and inexpensive since the external motor unit can also be used in combination with other accessories. The gear mechanism is preferably a speed reducer, to ensure that the speed at which the tool is driven in the bowl is sufficiently smaller than the entered speed.

Preferably, the transmission coupling comprises coaxially arranged inner and outer first coupling elements, in order to be able to transmit both rotational speeds to be provided by the transmission coupling at the same time. The inner and outer first coupling elements can be rotated at different speeds and are formed as two distinct components.

In this context it is also preferred that the splash guard comprises an intermediate coupling element which can be coupled to the transmission coupling and the tool such that a torque output by the transmission coupling is transmitted to the tool. The intermediate coupling element is provided between the cover and the tool.

By providing a corresponding intermediate coupling element, an unsealed opening in the splash guard for exerting a torque on the tool is not required. Thus, this feature also serves to prevent soiling the cover. In this regard the tool is preferably designed such that it cannot be driven by the cover alone when the splash guard is not installed. This prevents the tool being directly driven by the cover. This would be impermissible according to the applicable safety standards (such as IEC 60335), since when there is no splash guard there is also no delivery tube and therefore insufficient protection against accidental contact. A corresponding feature can be achieved by a (short) length of the tool or a corresponding design of the coupling thereof.

It is preferred that the intermediate coupling element consists of two coaxially arranged elements, an inner and an outer second coupling element, which are designed to be driven simultaneously at different rotational speeds. In other words, they can be rotated independently from one another. In this way, by selectively coupling the tool to the inner or outer first coupling element, a tool can be driven faster or slower as required.

It is preferable in this regard for the inner and/or outer second coupling element to be formed in one piece. Such a second coupling element is easier to produce and is less delicate, which results in an increased service life.

Furthermore, it is preferred that on the sides facing the cover and/or facing away from the cover the inner and outer second coupling elements have different geometries for torque transmission between the two sides. Since the tool is designed in such a way that it can only be coupled to the output side of the (respectively associated) second coupling element, it can no longer be coupled directly to one of the first coupling elements. This prevents the tool from being directly connected to the cover when a splash guard is not installed, which, in turn, improves safety, as mentioned above.

Moreover, it is preferred that it is possible to remove the combination of splash guard and cover as one unit from the bowl. This improves user-friendliness when emptying the bowl, for example.

It is also preferred that the domestic appliance comprises a device which generates a preload force between the cover and the splash guard, which is directed such that it pushes the cover and the splash guard away from one another. This feature results in the safety of the domestic appliance being improved. Such a preload force increases the probability that a user will not be able to operate the appliance unintentionally. If an intermediate coupling element is present, this will be separated from the transmission coupling unless the preload force is counter-balanced by a corresponding counterforce, which results in a torque only being able to be exerted on the tool if the splash guard, the cover and the tool are all installed as intended and a corresponding counterforce is generated. This counterforce is generated in the installed state by the splash guard being supported in the bowl and the cover being locked onto the bowl. This prevents a user from being able to unintentionally operate the tool when the bowl is not correctly installed with the cover and splash guard, since otherwise it would be possible for the user to touch the tool during operation. Normally, such contact is prevented by the splash guard and the cover. Thus, this feature improves the safety of the domestic appliance.

Furthermore, it is preferred that the device comprises one or more pins, which are provided on the splash guard, and that it also comprises prestressed ejector elements, which are provided in the cover and which can exert a compressive force on the pin(s). Such a design of the device is easy to implement and therefore results in an inexpensive yet safe domestic appliance.

Moreover, it is preferred that the domestic appliance comprises a securing means for releasably securing the cover to the bowl. Providing a corresponding securing means improves both the safety of the domestic appliance and the user-friendliness thereof, since it prevents the cover from unintentionally coming off the bowl. The securing means preferably comprises a catch device in the cover, which is designed to lock onto a corresponding projection or a corresponding recess of the bowl. Such a catch device is easy for a user to use and therefore results in improved user-friendliness.

The domestic appliance preferably comprises a boss located in the bowl at the end opposite the opening, which allows the tool to be rotatably mounted. Such a boss results in a good and stable movement of a rotating tool in the bowl.

It is preferred that the plate of the splash guard has a corrugated profile. A corresponding design of the plate of the splash guard results in increased rigidity of the splash guard and is easy to clean.

Alternatively, the plate can also be designed without a corrugated profile and ribs can be attached to the underside to increase rigidity. This embodiment is more difficult to clean, however.

It is also preferred that the plate of the splash guard has reinforcement ribs. This feature also improves the service life of the splash guard.

Moreover, it is preferred that the splash guard has a bayonet coupling 100 on the circumference of its underside, for coupling it to certain tools. A corresponding design of the domestic appliance results in it being able to be used with various different tools.

In addition, it is preferred that the domestic appliance also comprises a tool for processing foods. This tool is typically inserted into the bowl. Such a domestic appliance has the advantages described above.

Furthermore, according to the invention, a splash guard is provided for a domestic appliance as defined in one of the claims. Such a splash guard has the advantages described above.

BRIEF DESCRIPTION OF THE DRAWINGS

FIGS. 1a) and 1b) show an assembled domestic appliance as according to the invention, wherein FIG. 1b) shows the appliance without the motor unit 10'.

DETAILED DESCRIPTION OF THE DRAWINGS

Figure 2:
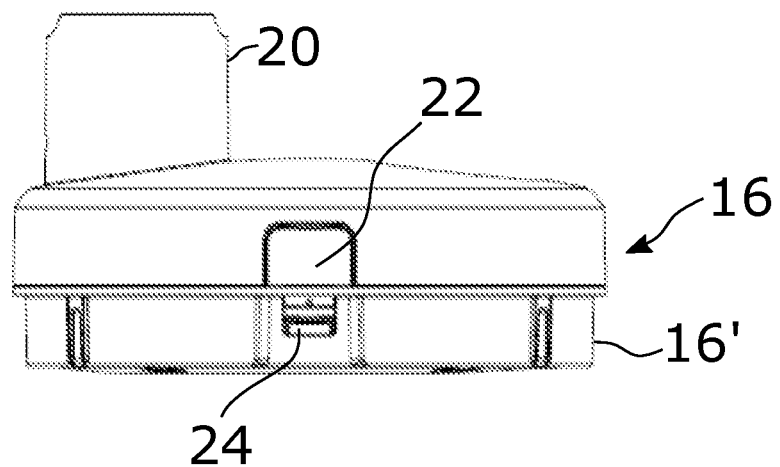
FIG. 2 shows the individual components of the domestic appliance of FIG. 1b).
Figure 2:
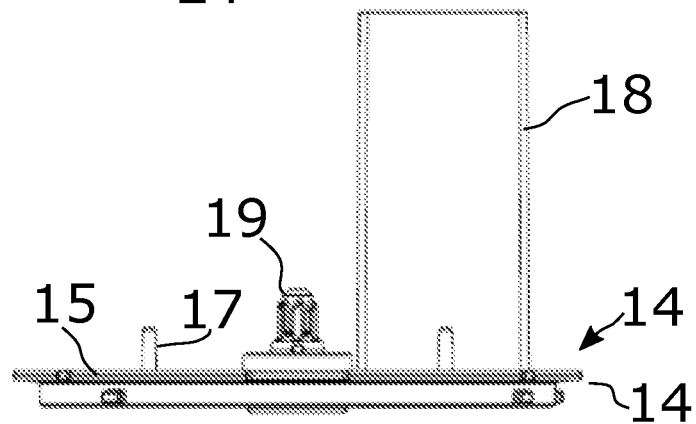
Figure 2:
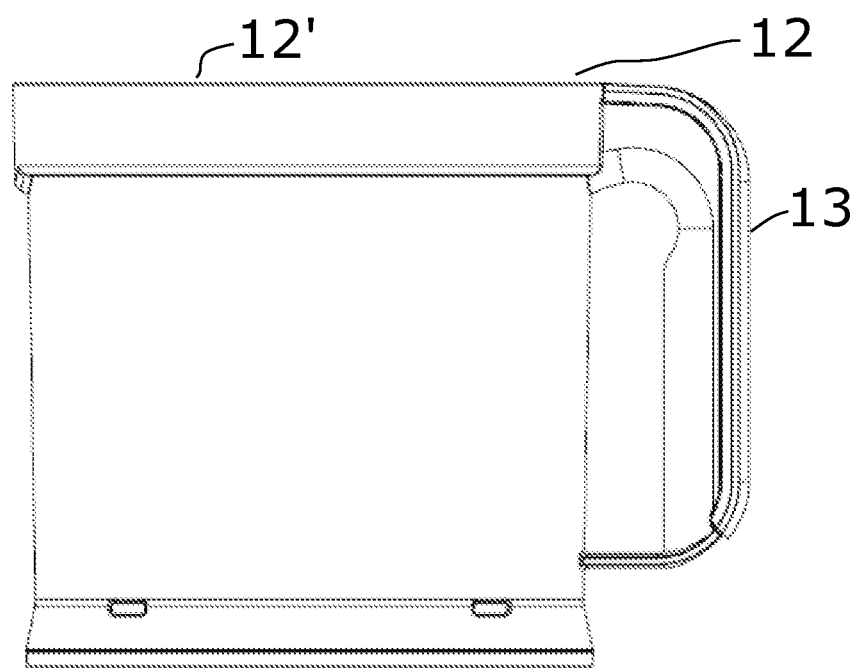

FIG. 1 shows a view of an assembled domestic appliance 10 for processing foods, as according to the invention. FIG.

1a) shows a domestic appliance 10 in which a separate motor unit 10' has been inserted. FIG. 1b) shows the domestic appliance 10 without this motor unit 10'.

As can be seen from FIGS. 1a) and 1b), the domestic appliance 10 comprises a bowl 12, on the outer side of which a handle 13 is provided. A splash guard 14 (not shown in FIG. 1) is inserted into an opening in the bowl 12. A delivery tube 18 protrudes upward from this splash guard 14 and allows foods to be introduced into the bowl 12 during operation. A cover 16 is placed on this splash guard 14. This cover 16 has an opening 28 through which the delivery tube 18 extends and which surrounds said delivery tube 18. Furthermore, the cover 16 has a top part 20 in which the motor unit 10' can be inserted.

FIG. 2 shows the individual components of the domestic appliance 10 of FIG. 1b). The cover 16 has the shape of a substantially circular cylinder, on the upper side of which the receptacle 20 extends, to receive the motor unit 10'. The cover 16 further comprises a recessed section 16', which can be inserted into the opening 12' of the bowl 12 and thereby seals it. Moreover, the cover 16 comprises a catch 24 which can engage with a corresponding projection (not shown) of the bowl 12 and therefore lock the cover 16 with respect to the bowl 12. This catch 24 can be released by means of a button 22, in order to allow the removal of the cover 16 from the bowl 12.

The splash guard 14 comprises a substantially flat plate 15 which can be inserted into the opening 12' of the bowl 12 such that the cover 16 can be placed on top of the splash guard 14 in such a way that the recessed section 16' is encircled by the opening 12'. The splash guard 14 comprises a boundary region 14' with projections, wherein this boundary region 14' abuts against the inner wall of the opening 12' during use and therefore foods being processed in the bowl 12 are prevented from spraying out, or it is at least made more difficult for them to do so. The delivery tube 18 extends on the side of the splash guard 14 which faces the cover 16 during use. On the same side, pins 17 (four in the present case) are also provided, which interact with the ejector elements 32 of the cover 16, which will be described in the following. The splash guard 14 also comprises an intermediate coupling element 19, which can be coupled to a corresponding transmission coupling 30 in the cover 16 such that a torque is exerted on the intermediate coupling element 19.

Figure 3:
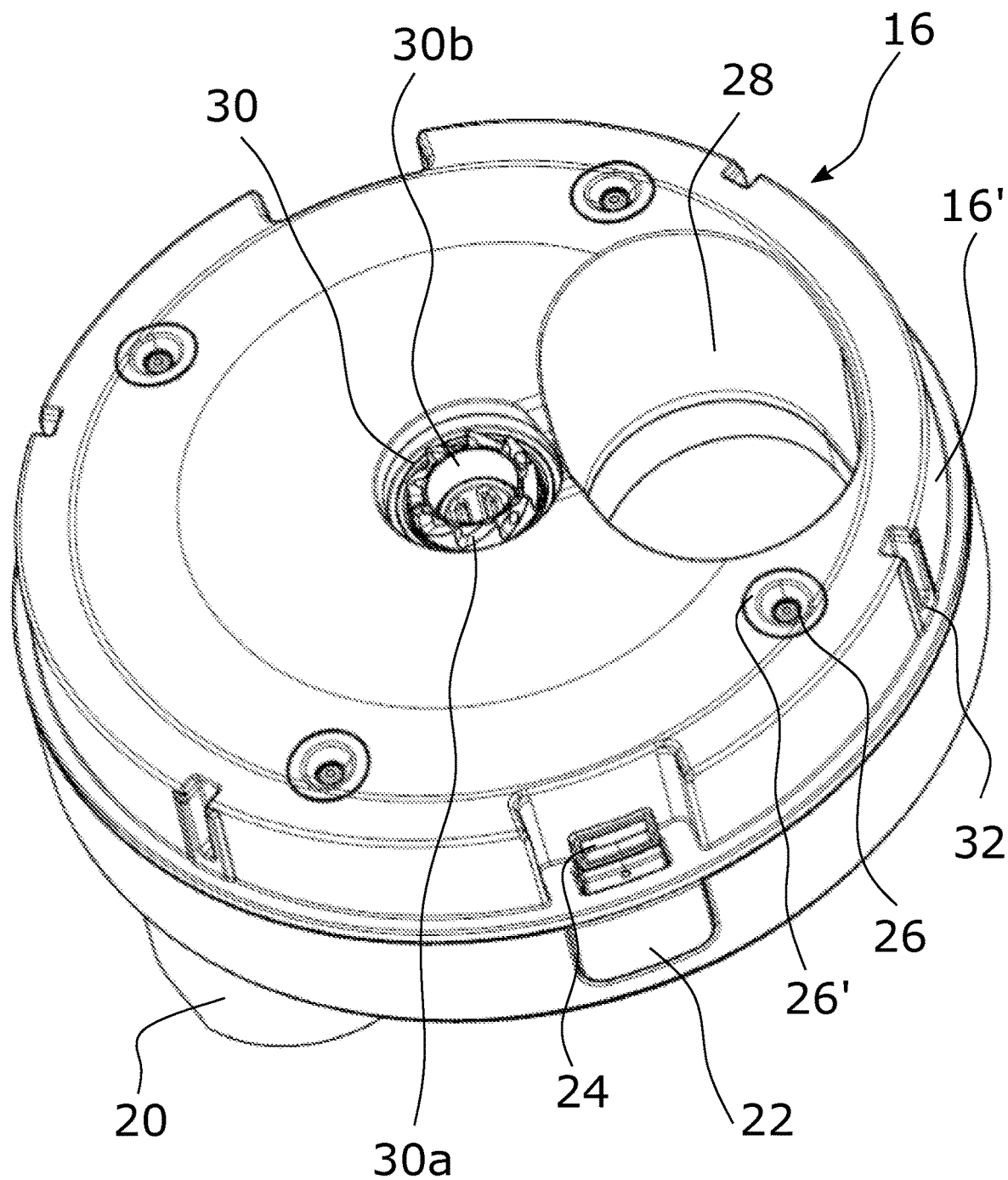
FIG. 3 shows a perspective view of the underside of the cover.

FIG. 3 shows a bottom view of the cover 16. This cover 16 has a substantially circular cross section. Provided in the recessed part 16' thereof are guide grooves 32, with which the cover 16 can be positioned relative to the opening 12' and prevented from rotating. An opening 28 goes through the cover 16, which opening is designed to allow the delivery tube 18 to pass through with minimal clearance. Moreover, ejector elements 26 (four in the present case) are provided in openings 26', which are prestressed by springs, which are not shown, such that they exert an outwardly directed force on the pins 17 inserted in the corresponding openings.

The transmission coupling 30 is located in the middle of the cover 16. This transmission coupling 30 serves to exert a torque on an intermediate coupling element 19 of the splash guard 14, which is inserted in this transmission coupling 30. In detail, this transmission coupling 30 comprises an inner first coupling element 30b for high speeds of the tool and an outer first coupling element 30a for lower rotational speeds of the tool. These two first coupling elements 30a, 30b are coupled to a gear mechanism 62 inside the cover 16, which transmits a torque input from the motor coupling 21 and outputs it to an intermediate coupling element 19 of the splash guard 14. In this regard the inner first coupling element 30b is designed such that it rotates at a higher speed than the outer first coupling element 30a, at the same rotational speed as the motor coupling 21.

Figure 4A:
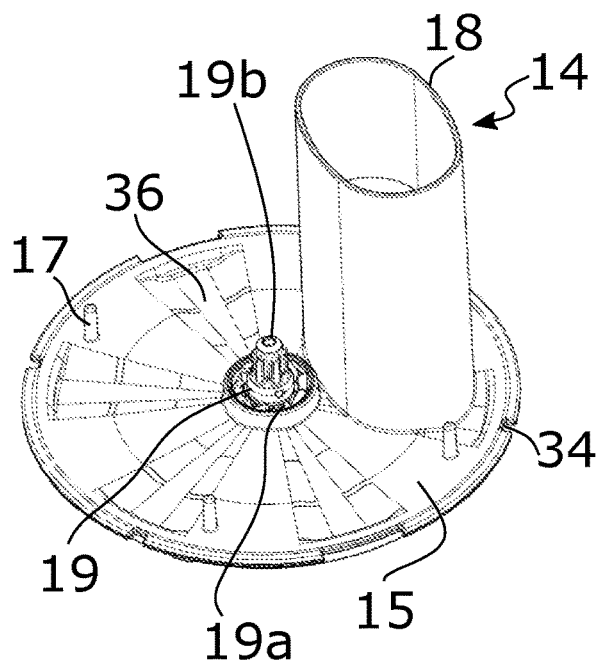
FIG. 4a) and b) show a plan view and a bottom view of the splash guard.
Figure 4B:
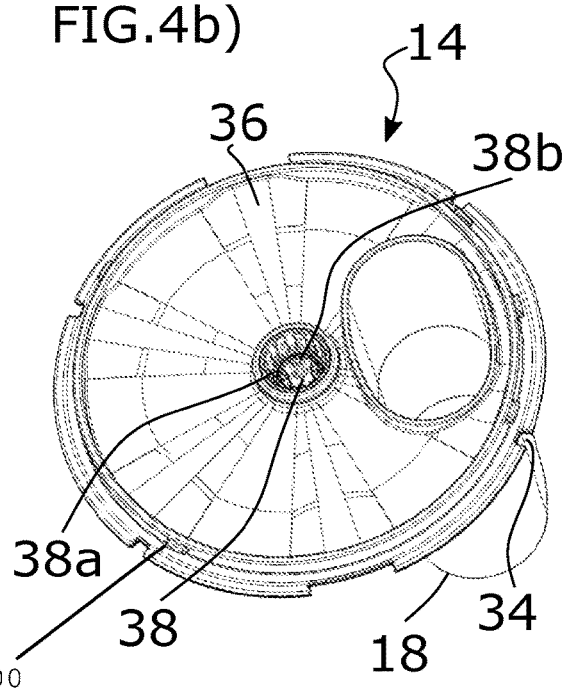

FIGS. 4a) and 4b) show a plan view or bottom view of the splash guard 14. The splash guard 14 comprises a substantially flat plate 15, which in this case has corrugations 36. These corrugations 36 extend radially and serve to reinforce the plate 15. Furthermore, pins 17 (four in the present case) are formed. The positions of these pins 17 are oriented to the positions of the ejector elements 26, such that the pins 17 can penetrate into the openings 26' of the cover and that then the ejector elements 26 each exert a reset force on the pins 17, which is directed such that it pushes the cover 16 and the splash guard 14 away from one another.

In the middle of the plate 15 an opening is provided, in which an intermediate coupling element 19 is rotatably mounted. This intermediate coupling element 19 comprises an inner second coupling element 19b and an outer second coupling element 19a for engaging with the outer first coupling element 30a and the inner first coupling element 30b of the cover 16, such that the inner first coupling element 30b can exert a torque on the inner second coupling element 19b, or the outer first coupling element 30a can exert a torque on the outer second coupling element 19a. In this way, the intermediate coupling element 19 can be rotated by the transmission coupling 30. The inner second coupling element 19b and the outer second coupling element 19a can be rotated independently from one another.

Figure 5:
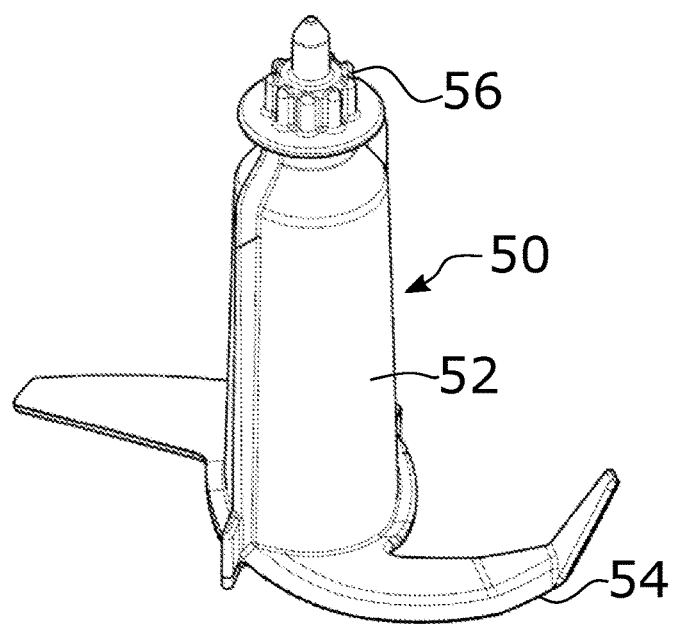
FIG. 5 shows a tool which can be used in the domestic appliance of FIG. 1.

On the underside of the splash guard 14 there is an output section 38 as part of the intermediate coupling element 19, which comprises an outer output coupling 38a or an inner output coupling 38b which can engage with the corresponding coupling 56 of the tool 50 (cf. FIG. 5). The outer output coupling 38a is part of the outer second coupling element 19a, and the inner output coupling 38b is part of the inner second coupling element 19b. Depending on the tool, the coupling 56 is designed such that it either engages with the inner output coupling 38a or the outer output coupling 38b, as a result of which either a high or a low rotational speed can be transmitted to this tool 50. Recesses 34 are located in the respective boundary regions 14' of the splash guard 14, the function of which corresponds to that of the grooves 32 and which serve to position the splash guard 14 relative to the bowl 12 and prevent it from rotating. The number of these recesses 34 and grooves 32 in the cover 16 is not restricted.

FIG. 5 shows an example of a tool 50 that can be used in the domestic appliance 10. The tool 50 has a shaft 52 on which (in the present case two) arms 54 are provided for kneading foods. A coupling 56 for coupling to the output section 38 of the intermediate coupling element 19 (or more precisely to either the inner or outer output coupling 38a, 38b) is located at the end of the shaft 52 that is opposite the arms 54.

Figure 6:
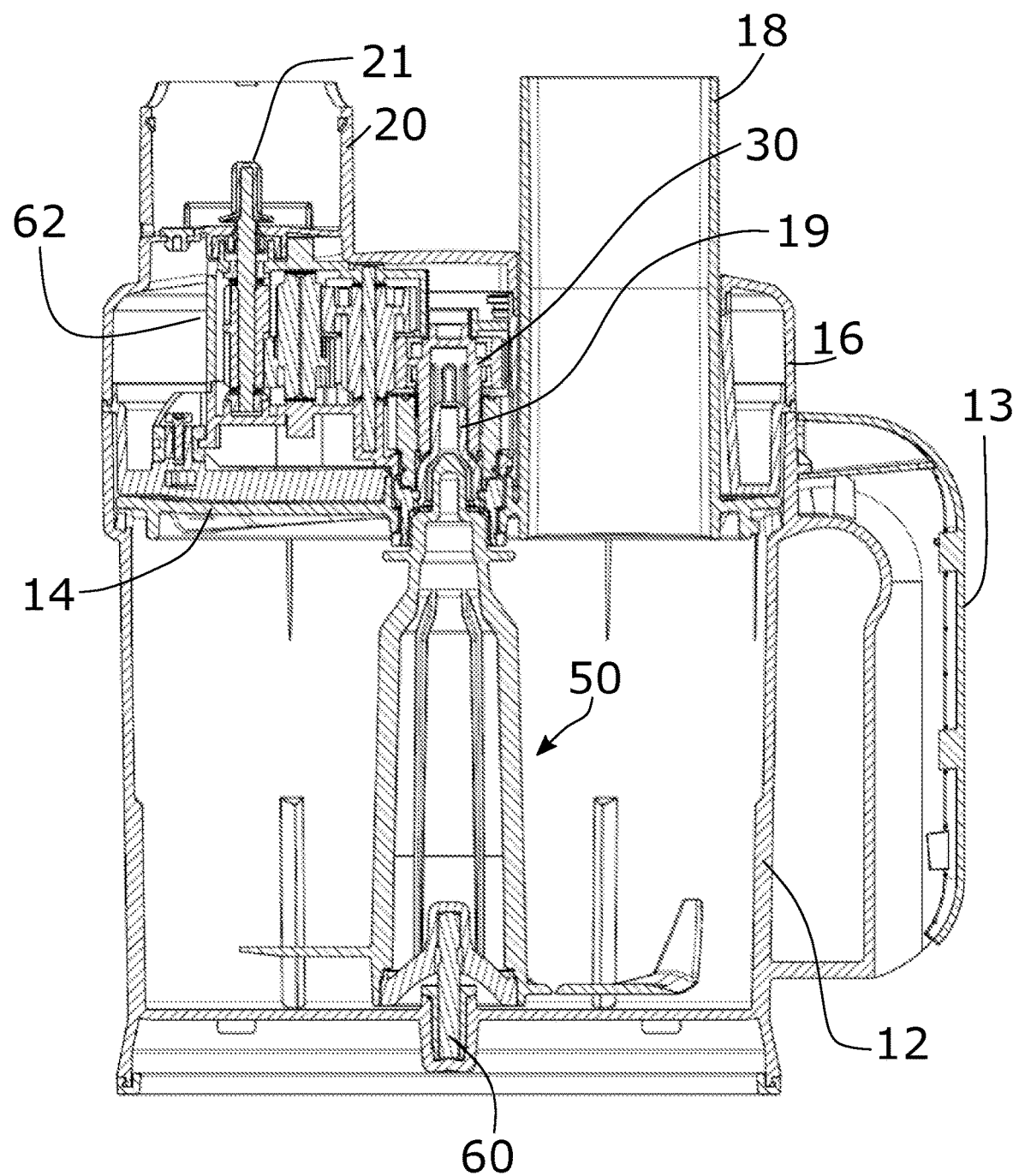
FIG. 6 shows a sectional view through the domestic appliance of FIG. 1b).

FIG. 6 shows a sectional view through the domestic appliance 10 of FIG. 1b). As can be seen, the tool 50 is rotatably mounted on a boss 60 which is provided on the underside of the bowl 12, such that the tool 50 can rotate about the axis of the shaft 52 inside the bowl 12. At the upper end of the shaft 52 the coupling 56 is engaged with the output section 38 of the intermediate coupling element 19, which is rotatably mounted in the splash guard 14. This intermediate coupling element 19 is in turn engaged with the transmission coupling 30, which is connected to the motor coupling 21 via the gear mechanism 62. When a motor in this state exerts a torque on the motor coupling 21, the torque is transmitted via the gear mechanism 62 to the transmission coupling 30, from here it is transmitted to the intermediate coupling element 19 and from here, finally, to the tool 50, such that this tool 50 rotates inside the bowl 12 and comminutes the foods located inside the bowl 12.

Figure 7:
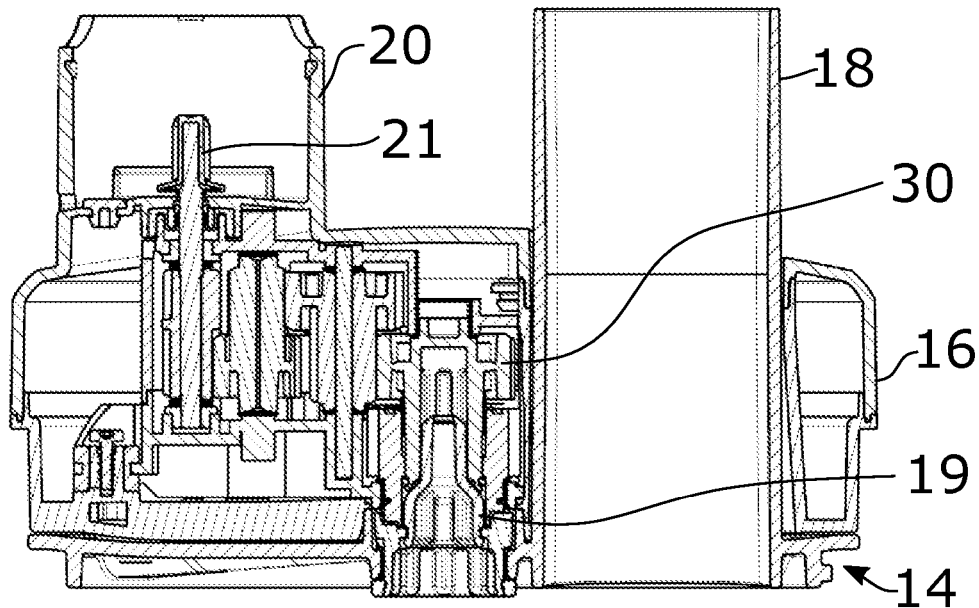
FIG. 7 shows the splash guard and the cover of the domestic appliance in the assembled and pushed together state.
Figure 8:
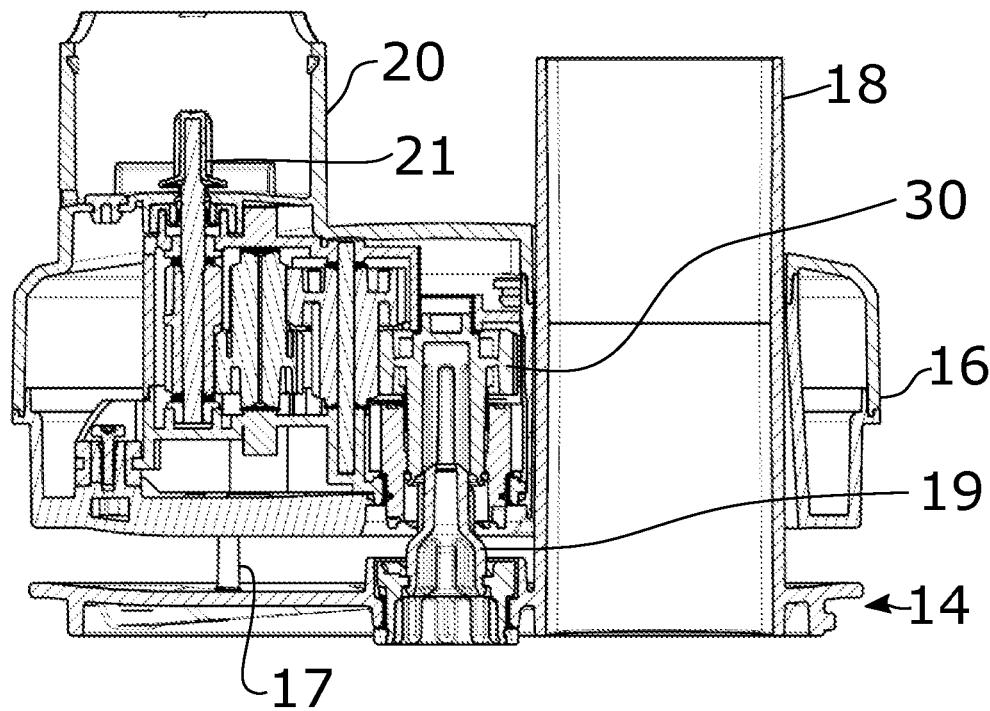
FIG. 8 shows the splash guard and the cover of the domestic appliance in a state in which these are pre-installed but pushed apart by the spring force of the ejector elements, for example when they are not inserted into the bowl.

FIGS. 7 and 8 are sectional views of the assembled arrangement consisting of the cover 16 and the splash guard 14. In FIG. 7 the splash guard 14 and the cover 16 are pushed together, such that the ejector elements 32 are pushed into the cover 16 against the preload force thereof. In this state, the intermediate coupling element 19 is engaged with the transmission coupling 30, such that the transmission coupling 30 can exert a torque on the intermediate coupling element 19. This would mean that a torque exerted on the motor coupling 21 would be transmitted to the intermediate coupling element 19 and that therefore a tool 50 which is coupled to the intermediate coupling element 19 could rotate. If a user reaches into the tool 50 in such a state, this could result in injury to the user and also to damage to the tool 50.

To avoid this, the ejector elements 32 and the pins 17 are provided, which are designed in such a way that they push away the cover 16 from the splash guard 14 when it is not resting on the bowl, as shown in FIG. 8. In this state, the intermediate coupling element 19 and the transmission coupling 30 are not engaged, so that a torque exerted on the motor coupling 21 will not result in the intermediate coupling element 19 rotating, and therefore a tool 50 located in this intermediate coupling element 19 would not be caused to rotate either. Thus, in this state it would not be possible for a user to injure himself on such a rotating tool 50. However, since this is the "resting state" or default state of the domestic appliance or of the arrangement consisting of the cover 16 and the splash guard 14, the normal state of the domestic appliance is therefore safe.

It is only when the cover 16 and the splash guard 14 are pushed together that a torque exerted on the motor coupling 21 can result in the rotation of the intermediate coupling element 19. For this, however, a counterforce to the reset force of the ejector elements 32 has to be generated. In the assembled state of the domestic appliance 10 as shown in FIG. 1b, this counterforce is generated inter alia using the catch 24. As a result of the fact that the cover 16 can lock onto the bowl 12, the cover 16 is prevented from being pushed away from the splash guard 14. Thus, in the state shown in FIG. 1b), the intermediate coupling element 19 engages with the transmission coupling 30 and is held in this state by means of the catch 24. However, in principle it would also be possible to do without this catch 24, but in that case it would have to be ensured in a different way (for example by a correspondingly high weight of the cover 16 or by a force exerted by the user) that the cover 16 is pressed sufficiently hard onto the splash guard 14.

Thus, the combination of the one or more pins 17, the one or more prestressed ejector elements 32 and the catch 24, or securing means, results in a domestic appliance which provides a high level of safety while at the same time being user-friendly.

The invention claimed is:

1. A domestic appliance for processing foods, comprising:
    a bowl, which has an opening for introducing foods into the bowl and into which a tool for processing foods is inserted,
    a splash guard, which can be inserted into the opening of the bowl, wherein boundary regions of the splash guard are opposite an inner wall of the opening to prevent foods from spraying out of the bowl, and
    a cover, which can be inserted into the opening of the bowl, without first installing the splash guard in the opening,
    characterized in that
    the splash guard further comprises a plate, which extends substantially flat to the boundary regions, wherein the cover rests on the splash guard without penetrating into the splash guard;
    wherein the cover substantially covers the bowl when the cover is installed in the bowl.

2. The domestic appliance according to claim 1, wherein the splash guard further comprises a delivery tube for foods, through which foods are introduced into the bowl.

3. The domestic appliance according to claim 1, wherein the cover further comprises a motor coupling to which an external motor unit is coupled, and a transmission coupling coupled to the motor coupling via a gear mechanism, wherein the transmission coupling is configured to output a torque generated by the external motor unit and exerted on the motor coupling.

4. The domestic appliance according to claim 3, wherein the splash guard further comprises an intermediate coupling element coupled to the transmission coupling and the tool, such that a torque output by the transmission coupling is transmitted to the tool.

5. The domestic appliance according to claim 4, wherein the intermediate coupling element comprises coaxially arranged inner and outer second coupling elements which second coupling elements are designed to be driven simultaneously at different rotational speeds.

6. The domestic appliance according to claim 5, wherein the inner and outer second coupling element is formed in one piece.

7. The domestic appliance according to claim 5, wherein the inner and outer second coupling elements have different geometries for torque transmission on sides that are opposite the cover and are opposite the foods to be processed during use.

8. The domestic appliance according to claim 4, further comprising a device which generates a preload force between the cover and the splash guard, which pushes the cover and splash guard away from one another, wherein the transmission coupling and the intermediate coupling element are not engaged in a disengaged state so that driving of the tool is not possible.

9. The domestic appliance according to claim 8, wherein one or more pins, are provided on the splash guard, and one or more prestressed ejector elements are provided in the cover, which ejector elements exert a compressive force on the pin(s).

10. The domestic appliance according to claim 1, further comprising a securing device for releasably securing the cover to the bowl, wherein the securing device comprises a catch device in the cover which locks onto the bowl.

11. The domestic appliance according to claim 1, wherein the bowl further comprises at an end opposite of the opening a boss which rotatably mounts the tool.

12. The domestic appliance according to claim 1, wherein the plate of the splash guard has a corrugated profile.

13. The domestic appliance according to claim 1, wherein the plate of the splash guard has reinforcing ribs.

14. The domestic appliance according to claim 1, wherein the splash guard further comprises a bayonet coupling coupled to the tool.

15. The domestic appliance according to claim 1, further comprising the tool for processing foods.

16. The domestic appliance according to claim 1, wherein the cover substantially covers the plate of the splash guard when both the splash guard and the cover are installed in the bowl.

* * * * *